UNITED STATES PATENT OFFICE.

ELIAKIM P. NEWTON, OF CLINTONVILLE, PENNSYLVANIA.

IMPROVEMENT IN ROOFING COMPOSITIONS.

Specification forming part of Letters Patent No. 114,325, dated May 2, 1871.

*To all whom it may concern:*

Be it known that I, ELIAKIM P. NEWTON, of Clintonville, county of Venango, and State of Pennsylvania, have invented certain new and useful Improvements in Roofing Compounds; and I do hereby declare that the following is a true and exact description of the manner of making and using the same.

The nature of my invention consists in the combination of the ingredients hereinafter named, when the same are compounded substantially in the manner hereinafter set forth.

To enable others skilled in the art to make and use my roofing, I will now proceed to describe my mode of compounding and using the same.

I take one gallon of resin and one quart of pine-tar, and, putting them in a suitable vessel, I bring them to a boil. I then stir one pint of common salt, one-half pint of alum, and one gallon of clean sifted sand therein, and boil all together for about ten minutes, and while yet hot I spread or pour it over the roof, which may previously have been prepared for the reception of the compound, or over the common shingle roof.

By continuing this process several times, until the coating is sufficiently thick, a permanent, cheap, and effective roofing is obtained, as the compound, when cold, becomes solid and almost as hard as rock.

I am aware that the various ingredients of which my compound is composed have been used in other combinations, but am convinced that the peculiar combination herein stated has never been before used.

What I claim, therefore, as my invention is—

The combination of resin, tar, salt, alum, and sand, when treated in the manner set forth, for the purpose described.

ELIAKIM P. NEWTON.

Witnesses:
BYRON CROSS,
JOHN C. HOVES.